US007082847B2

(12) United States Patent
Feygin

(10) Patent No.: US 7,082,847 B2
(45) Date of Patent: Aug. 1, 2006

(54) SEALING DEVICE

(75) Inventor: Ilya Feygin, Mountainside, NJ (US)

(73) Assignee: TechElan, LLC, Mountainside, NJ (US)

( * ) Notice: Subject to any disclaimer, the term of this patent is extended or adjusted under 35 U.S.C. 154(b) by 110 days.

(21) Appl. No.: 10/769,447

(22) Filed: Jan. 30, 2004

(65) Prior Publication Data

US 2004/0182986 A1 Sep. 23, 2004

Related U.S. Application Data

(60) Provisional application No. 60/443,791, filed on Jan. 30, 2003.

(51) Int. Cl.
*G01N 1/20* (2006.01)

(52) U.S. Cl. .................................... 73/863.65; 429/181

(58) Field of Classification Search ................ 248/611; 429/181; 73/863.65
See application file for complete search history.

(56) References Cited

U.S. PATENT DOCUMENTS 4,252,873 A * 2/1981 Epstein et al. .............. 429/181
5,062,310 A * 11/1991 Eaton ......................... 73/866.5
5,128,072 A * 7/1992 Schydlo ...................... 261/64.1
5,232,014 A * 8/1993 Hiltebrand ............... 137/515.7
5,855,852 A * 1/1999 Bienhaus et al. ........... 422/102

* cited by examiner

*Primary Examiner*—Kimberly Wood
(74) *Attorney, Agent, or Firm*—DeMont & Breyer, LLC

(57) ABSTRACT

An apparatus for sealing a wide variety of vessels and for providing access to the interior of such vessels while sealed. In some embodiments, a sealing apparatus includes a base plate, a cover plate, and a seal that is disposed therebetween. In use on a vessel, when the seal is disposed in a rest position, it covers a vessel-access hole that penetrates the base plate and communicates with the underlying vessel. To temporarily displace the seal, a tube, such as a syringe needle, etc., is inserted through a guide hole in the cover plate. The tube contacts the seal, which forces the seal to move at least partially out of its sealing position. With continued downward movement, the tube enters the underlying vessel so that it can withdraw or add fluid to it. When the tube is withdrawn, the seal returns to its sealing position.

5 Claims, 1 Drawing Sheet

SEALING DEVICE

STATEMENT OF RELATED CASES

This case claims priority of U.S. provisional patent application 60/443,791, which was filed on Jan. 30, 2003, which is incorporated by reference herein.

FIELD OF THE INVENTION

The present invention relates to an apparatus for accessing the interior of a sealed vessel, such as to add or sample reagents, solvents, etc., during processing operations.

BACKGROUND

It is common, during chemical, pharmaceutical, and other types of processing operations, to seal a vessel. In many cases, access to the interior of the sealed vessel, such as to add or sample reagents, solvents, etc., must be provided during processing operations.

Existing techniques, which use septums or automated covers, have a variety of drawbacks (e.g., life expectancy, sealing properties, complexity, etc.).

SUMMARY

Some embodiments of the present invention are capable of sealing a wide variety of vessels and for providing access to the interior of that vessel while it is sealed.

In accordance with the illustrative embodiment, a sealing apparatus includes a base plate, a cover plate, and a seal. The base plate includes one or more dimples or depressions. A vessel-access opening is disposed in each dimple. The opening extends completely through the base plate. The cover plate also includes one or more dimples or depressions. In the illustrative embodiment, the dimples in the cover plate are larger than the dimples in base plate. A guide hole is disposed in each dimple in the cover plate.

The seal, which in the illustrative embodiment is a ball or sphere, is received by each dimple in the base plate. In some embodiments, the seal and dimple are appropriately sized (and shaped) so that when seal is disposed in a rest position within the dimple, the seal completely fills the dimple and advantageously covers the vessel-access opening.

In use, the cover plate and the base plate are tightly engaged to an underlying vessel or carrier. In the absence of any force disturbing it, each seal is received in a sealing position by dimples in the base plate. In the sealing position, the seal substantially fills the dimple and advantageously covers the vessel-access opening. In some embodiments, in the sealing position, the seal does not contact the surface of the dimples in cover plate.

To temporarily displace the seal, a tube, such as a syringe needle, etc., is inserted through the guide. As the tube is pushed further into cover plate, it breaches the surface of the dimple (in the cover plate) and eventually contacts the seal. Continued downward movement of the tube forces the seal to move at least partially out of its sealing position within the dimple in the base plate. With continued downward movement, the tube enters the underlying vessel so that it can withdraw or add fluid to it. When the tube is withdrawn, the seal returns to its sealing position.

DETAILED DESCRIPTION

Figure 1:
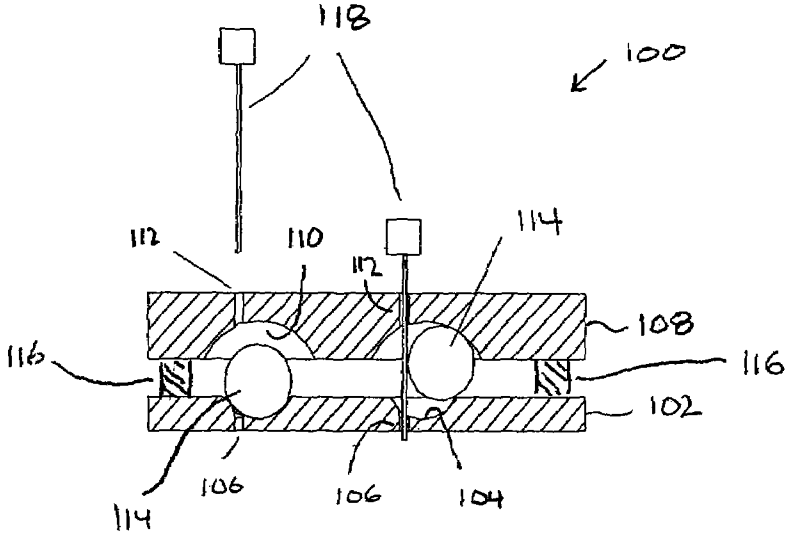
FIG. 1 depicts apparatus 100 in accordance with the illustrative embodiment of the present invention.

In accordance with the illustrative embodiment, and as depicted in FIG. 1, sealing device 100 includes base plate 102, cover plate 108, and seal 114. Base plate 102 includes one or more dimples or depressions 104. In the illustrative embodiment, only two dimples 104 are depicted. In other embodiments, fewer or more dimples are present. In the illustrative embodiment, dimples 104 are circular in shape. Vessel-access hole 106 is disposed in each dimple 104. In the illustrative embodiment, the vessel-access hole is disposed off-center in dimple 104; however, in some other embodiments, vessel-access hole 106 is disposed at the center of dimple 104.

Cover plate 108 includes one or more dimples or depressions 110. In some embodiments, dimples 110 are larger than dimples 104 in base plate 102. In the illustrative embodiment, dimples 110 are circular in shape. Guide hole 112 is disposed in each dimple 110 in the cover plate.

Seal 114, which is depicted in the illustrative embodiment as a ball or sphere, is received by each dimple 104 in base plate 102. In some embodiments, seal 114 and dimple 104 are appropriately sized (and shaped) so that when seal 114 is disposed in an undisturbed or rest position within dimple 104, the seal 114 completely fills the dimple. For the illustrative embodiment in which dimple 104 has a hemispherical shape and seal 114 is a sphere, the seal should have a diameter that is at least as large as that of dimple 104.

In some other embodiments, seal 114 is smaller than dimple 104, yet appropriately sized so that when the seal is in an undisturbed or rest position within dimple 104, seal 114 covers vessel-access hole 106. This latter group of embodiments should only be used in applications in which sealing device 100 will remain undisturbed and advisably motionless. The reason for this is that if the sealing device is disturbed, seal 114 might move such that vessel-access hole 106 is uncovered. In embodiments in which seal 114 is smaller than dimple 104, uncovering vessel-access hole 106 would cause an underlying vessel to lose seal.

Cover plate 108 and base plate 102 advantageously include alignment fidicials (not depicted) which, when mated, align dimples 104 in base plate 102 with dimples 110 in cover plate and guides holes 112 with vessel-access holes 106.

Figure 2:
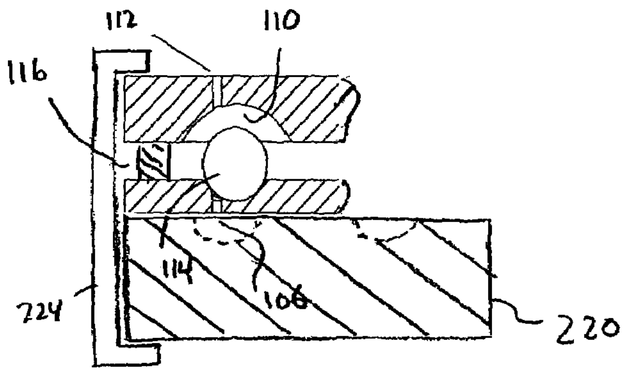
FIG. 2 depicts apparatus 100 engaged to a vessel in a sealing mode.
Figure 3:
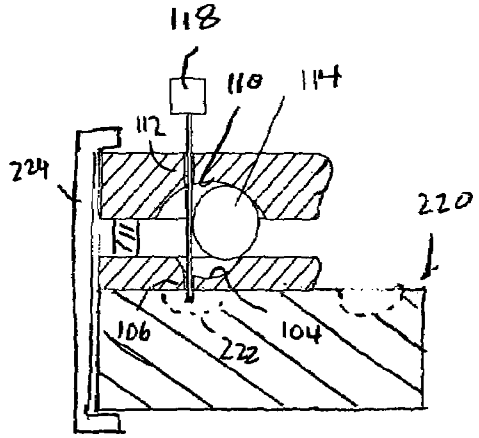
FIG. 3 depicts apparatus 100 engaged to a vessel wherein a tube passes the seal to gain access to the vessel.

In use, as depicted in FIGS. 2 and 3, cover plate 108 and base plate 102 are tightly engaged to an underlying vessel or carrier 220. In the illustrative embodiment, carrier 220 is a micro-well plate, as is well known in the art. For clarity, only a portion of carrier 220 and sealing apparatus 100 are depicted. Sealing device 100 is coupled to carrier 220 by any of a variety of well-known clamping arrangements 224, depicted figuratively in FIG. 2. The specific clamping arrangement that is used is a function of vessel type. Those skilled in the art will be able to design or select an appropriate clamping for use in coupling sealing device 100 to any vessel.

In the absence of any force disturbing it, each seal 114 is received in a sealing position by dimples 104. In the sealing position, as depicted in FIG. 2, seal 114 substantially fills the dimple and completely covers vessel-access hole 106. In the sealing position, seal 114 does not contact the surface of dimples 110 in cover plate 108.

In the illustrative embodiment, stand-offs are used to aid in preventing contact between seal 114 and the surface of dimples 110 in cover plate 108 when seal 114 is in a sealing position. In particular, cover plate 108 is spaced apart from base plate 102 by the stand-offs 116. The stand-offs and dimples 110 are appropriately dimensioned to prevent this type of contact. The stand-offs are advantageously, but not necessarily, formed from a resilient polymer material.

In an alternative embodiment, cover plate 108 abuts base plate 102. In the alternative embodiment, the dimples in at least the cover plate 108 (and in some cases, both the dimples in cover plate 108 and the dimples in the base plate 102) are somewhat deeper than in the illustrative embodiment. This ensures that when seal 114 engages dimple 104 in a sealing position, the seal does not contact the surface of dimple 110.

To temporarily displace seal 114, as depicted in FIG. 3, tube 118 (e.g., syringe needle, etc.) is inserted through guide 112. As tube 118 is pushed further into cover plate 108, it breaches the surface of dimple 110 and eventually contacts seal 114. Continued application of downward pressure forces seal 114 to move at least partially out of its sealing position within dimple 104. And it is for this reason (i.e., providing an ability to displace seal 114) that contact between seal 114 and dimples 110 is advantageously avoided (when seal 114 is in a sealing position).

With continued downward movement, tube 118 enters well 222 of vessel 220 through vessel-access hole 106. Liquid is aspirated from or dispensed into well 222 as desired using tube 118. Although aspiration/dispensing into a single well is depicted, it is to be understood that such aspiration/dispensing can be conducted simultaneously with a plurality of wells 222 of a multi-well plate.

After fluid is removed from or added to well 222, tube 118 is withdrawn. As the bottom of tube 118 clears the seal 114, the seal moves back into sealing position in dimple 104. In some embodiments, a spring, resilient material, or other device (not shown) that forces seal 114 to return to its rest position after tube 118 is removed is positioned near seal 114 (e.g., within dimple 110 in cover plate 108).

The size and shape of base plate 102 and cover plate 108 is, to some degree, application specific. For example, in the illustrative embodiment described above, sealing device 100 is adapted for use with microtitre plates. These plates are typically about 3 inches by 5 inches and include a regular array of 96, 384, or 1536 wells. Consistent therewith, base plate 102 and cover plate 108 should be rectangular in shape and have length and width dimensions of about 3 inches by 5 inches.

Additionally, each orifice 106 should align with a well in the microtitre plate. It is clear, then, that more dimples 104 and more orifices 106 are required when using a 384-well microtitre plate than a 96-well microtitre plate, etc.

In other embodiments, sealing device 100 is used with other types of vessels (e.g., vials, flasks, etc.). In such embodiments, however, modifications are required (relative to a sealing device for use with micro-well plates), as will be appreciated by those skilled in the art. For example, in most applications, base plate 102 and cover plate 108 will have a size that is consistent with the size of the mouth or opening of the vessel being sealed. And, far fewer dimples 104 and orifices 106 will typically be present when sealing device 100 is intended for use with an ordinary flask or vial.

It is to be understood that the above-described embodiments are merely illustrative of the present invention and that many variations of the above-described embodiments can be devised by those skilled in the art without departing from the scope of the invention. For example, in this specification, specific details are provided in order provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Furthermore, the particular features, structures, materials, or characteristics can be combined in any suitable manner in one or more embodiments. It is therefore intended that such variations be included within the scope of the following claims and their equivalents.

I claim:

1. An apparatus comprising:

a depression in a first major surface of a base plate;

a vessel-access hole, wherein said vessel-access hole is disposed off-center in said depression and penetrates said base plate;

a cover plate, wherein said cover plate is disposed above said base plate;

a guide hole, wherein said guide hole is disposed in said cover plate and aligns with said vessel-access hole; and a seal, wherein said seal is disposed in said depression and is movable.

2. The apparatus of claim 1 further comprising a depression in a second major surface of said cover plate, wherein said second major surface is opposed to and spaced apart from said first major surface of said base plate.

3. The apparatus of claim 2 wherein said depression in said second major surface is larger than said depression in said first major surface.

4. The apparatus of claim 1 wherein said vessel-access hole and said guide hole are sized to receive a needle of a syringe.

5. The apparatus or claim 1 wherein said seal is spherical.

* * * * *